Feb. 1, 1927. 1,616,135
J. J. McCOY
TRAFFIC SIGNAL
Filed Sept. 3, 1925 2 Sheets-Sheet 1

INVENTOR:
John J. McCoy
BY David E. Carlsen
ATTORNEY.

Feb. 1, 1927.

J. J. McCOY 1,616,135

TRAFFIC SIGNAL

Filed Sept. 3, 1925   2 Sheets-Sheet 2

INVENTOR
John J. McCoy
BY David E. Carlsen
ATTORNEY

Patented Feb. 1, 1927.

1,616,135

UNITED STATES PATENT OFFICE.

JOHN J. McCOY, OF ST. PAUL, MINNESOTA.

TRAFFIC SIGNAL.

Application filed September 3, 1925. Serial No. 54,247.

This invention relates to traffic signals of the class used at street intersections and known as "stop and go" signals.

The main object is to provide an inexpensive, durable and reliable signaling device that will operate automatically at desired intervals for long periods.

Figure 1:
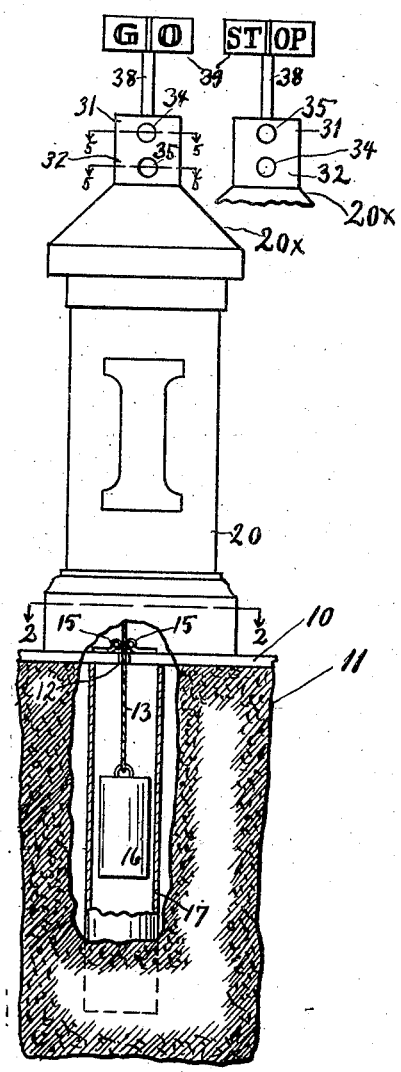
Fig. 1 is a partly sectional side elevation of the improved signaling device.
Figure 2:
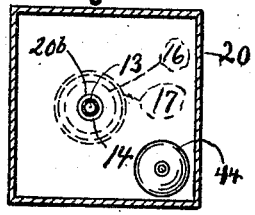
Fig. 2 is a section on the line 2—2 in Fig. 1.

Referring to the drawings by reference numerals, 10 designates any suitable base, floor or platform of the device. Said base rests on the ground 11 and has a hole 12 for an operating cable 13 which may be guided by a collar 14, as in Fig. 2, or by guiding rollers 15 as in Fig. 3, and has its lower end attached to a weight 16 placed in a suitable vertical tube 17 sunk in the ground. The upper end of said cable 13, which may be a rope or chain, is secured to and wound on a drum 18 (see Fig. 4) fixed on a horizontal shaft 19 which may be journaled in one of the walls of the hollow stand or housing 20 of the device, and in a bracket 21 secured to one of said walls (see Figs. 3 and 4).

Fixed on said drum shaft is a gear 22 meshing with a pinion 23 fixed on a winding shaft 24 having a detachable hand crank 25 for raising the weight. The shaft 24 may extend across the whole housing 20 and be journaled in two of its walls, or in framework secured thereto as indicated by the arm 21ᵃ of the bracket 21 in Fig. 3.

Fixed on the shaft 24, or to its pinion 23, is a ratchet wheel 26 engaged by a pawl 27 which is pivoted on a wheel 29 and is under yieldable pressure of a spirng 28. The wheel 29 is provided with a series of radial arms or fingers 30 and is held against accidental rotation on the shaft 24 by any suitable friction washers or like means (not shown).

Figure 5:
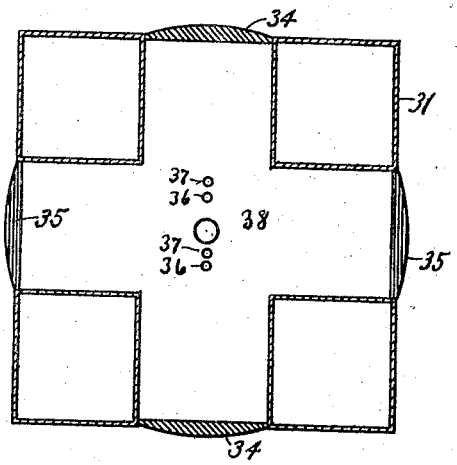
Fig. 5 is an enlarged section on either of the two lines 5—5 in Fig. 1.

Mounted upon the housing or stand 20 are an upper light chamber 31 and a lower one 32 which may be separated by a floor 33. Each of said chambers are provided with two opposite green colored lenses 34 and at right angles thereto it has two opposite red colored lenses 35. Arranged in each of said chambers is a gas light burner 36 and a pilot light 37 adjacent it, or each chamber may have two such burners and two pilot lights, as indicated in Fig. 5, since otherwise the vertical mast or shaft 38 of the semaphore 39 may partly obstruct the light to some of the lenses. The pilot lights receive gas through pipes 41, 42, 43 from a gas tank 44 and the gas burners 36 receive gas from the same tank through pipes 45 and 46 alternately as the two pipes have their intakes controlled by a two way valve 47 the plug of which is oscillated by a lever 48 fixed to it and having at one end a weight 49 holding it in one position, and at the other end the lever has a curved arm 50 which is depressed by each passing arm 30 of the wheel 29. In other words, when the weight 49 is down the gas escapes in the upper light chamber and being there ignited by the pilot light the lenses in the top chamber are illuminated and when the weight 49 is raised by the action of an arm 30 upon lever arm 50 the burner in the lower light chamber gets a full supply of gas and illuminates the lower lenses. Thus the red and green lights are displayed alternately to indicate stop and go at predetermined intervals during the dark hours. During daylight the semaphore 39 will do the signaling because it is turned ninety degrees alternately in opposite directions at the same intervals as the gas burners are alternately lighted and extinguished. Such turning of the semaphore is caused by the following mechanism:

The central mast or shaft 38 is journaled in the light chambers and in the top portion 20ᵃ of the main housing 20. Said shaft 38 of the semaphore is supported by a collar 20ᵇ and has the regular cross-shaped top 39 with the words "Stop" and "Go" displayed on it. Near the lower end of said shaft are fixed a four-armed star-wheel 40ˣ and a collar 41ˣ. Between these elements is journaled on the shaft a horizontally swingable beam 42ˣ having pivoted at its upper side a dog 43ˣ held by a spring 44ˣ in contact with the star wheel and thus ready to impart a ninety degree rotation of the semaphore every time the beam is oscillated ninety degrees. Such oscillation of the beam is caused by the following means: The longer arm of the beam has a cord 45ˣ guided over a pulley 46ˣ and attached to a weight 47ˣ which at all times tend to pull and hold the beam against a stop 48ˣ (see Fig. 4) and when thus held the semaphore is at rest for a predetermined period of so many seconds as one of the crossing streets is supposed to be closed and the other street open for traffic. The short arm of the beam 42ˣ has a rigid horn 49ˣ projecting into the path of the rigid radial fingers 30 of the wheel 29, so that as each finger 30 passes with and over the top of wheel 29 it moves the horn 49ˣ before it until the beam has raised the weight 47ˣ and stops against a stop 50ˣ (see Fig. 4) and as the finger 30 then releases the horn 49ˣ the weight 47ˣ sinks again and brings the beam against the stop 48ˣ at the same time it causes the dog 43ˣ to give the star wheel and the semaphore a ninety degree rotation, thereby changing the signal so as to close the street that was previously open, and open the one that was closed.

Figure 3:
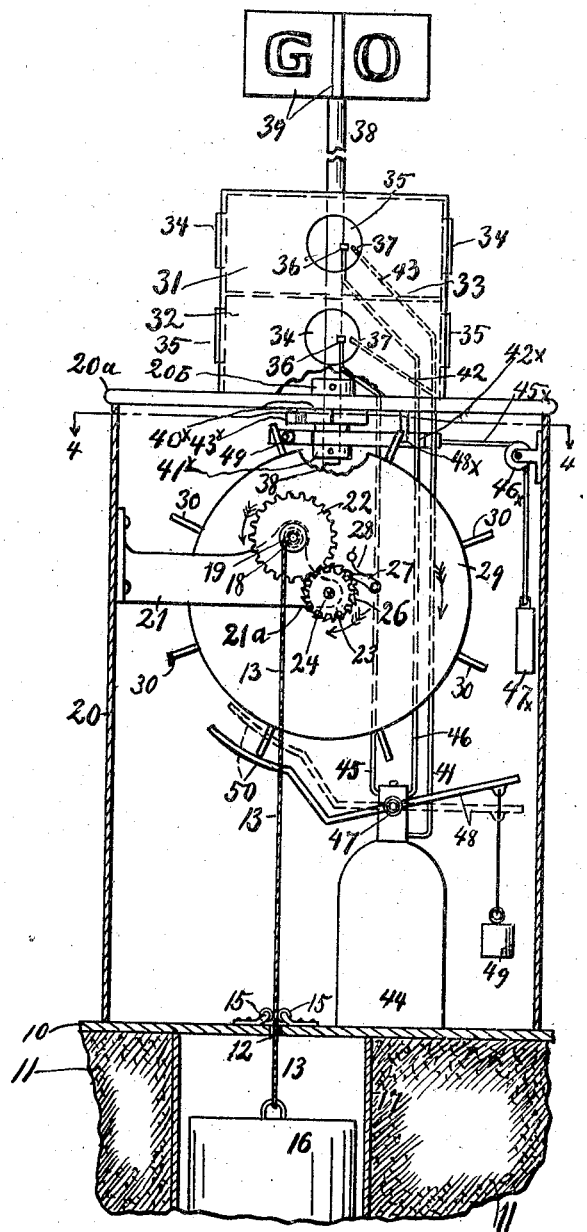
Fig. 3 is a general sectional side view of the main portions of Fig. 1 on an enlarged scale and with the ornamental hood 20ˣ in Fig. 1 omitted.

It will be understood that the curved arm 50 in Fig. 3 is first quickly depressed by each finger 30 and is then held down as long as the finger rides on it, and likewise the weight 49 holds the valve lever 48 down several seconds until the next finger 30 acts on the arm 50.

Figure 4:
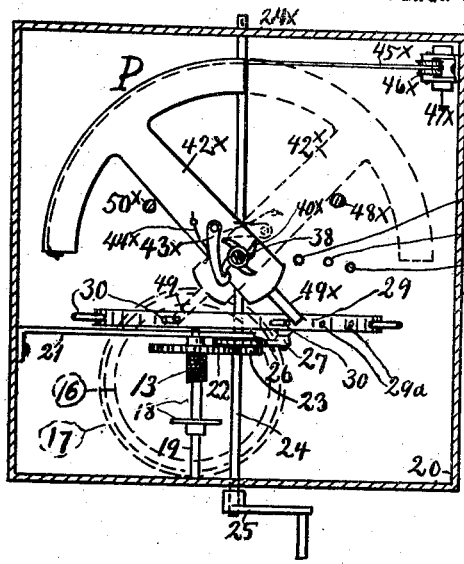
Fig. 4 is a section on the line 4—4 in Fig. 3.

Before the weight 16 is run fully down the crank 25 in Fig. 4 is used to wind the cable 13 on drum 18. Such winding is facilitated by using the pinion 23 to turn the gear 22. When the device is in operation said gear 22 multiplies the rotations of the pinion 26 and the wheel 29, so that a large weight may run the device quite a long time from a single winding, and in view of the ratchet mechanism 26—27—28 in Fig. 3 the wheel 29 may stand still during the winding process.

If so desired an electric motor may be used to rotate the wheel 29; but as it is not new to use electric motors and speed regulating means on automatically operated devices I have not shown such means, except simply a motor for rotating wheel 29, and as for regulating the speed the friction of the parts may be ordinarily relied on, and if not in all cases sufficient a simple brake (not shown) may be applied to any rotating part of the device.

It will be understood that in any case where it is desired to make the drum 18 in Fig. 4 longer instead of giving it several layers of cable the drum and the gears 22—23—26 may be placed in the larger space P in Fig. 4 and the crank 25 may then be placed at 24ˣ.

Figure 6:
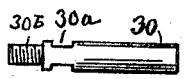
Fig. 6 is a detail view of one of the radial arms 30 in the wheel 29.

In Fig. 6 is shown that each pin or finger 30 has a flat portion 30ª for a wrench to get hold of and one end of the finger has a threaded portion 30ᵇ adapted to be screwed into threaded holes 29ª in the face of the wheel 29 at any desired spacing according as different localities may require the signals to change more or less frequently.

What I claim is:

In a stop and go signaling device for road intersections, a semaphore having a vertical shaft, a four armed star wheel fixed on the shaft, a beam journaled on the shaft adjacent the star wheel and having a spring-pressed pawl arranged to engage the star wheel and rotate it about ninety degrees at a time, a weight having a guided cord connected with one arm of the beam to swing it, means regulating the swinging of the beam by the weight, said beam having a horizontal projection, a motor driven wheel with horizontal shaft and having radial fingers arranged to engage at intervals the projections of the beam and by swinging it raise the weight and cause the pawl to engage the next tooth of the star wheel.

In testimony whereof I affix my signature.

JOHN J. McCOY.